United States Patent [19]

Perchenek

[11] Patent Number: 5,501,715
[45] Date of Patent: Mar. 26, 1996

[54] TERNARY ELEMENT COMPOUNDS IN THE Al-B-P SYSTEM, PROCESSES FOR THEIR PRODUCTION AND THEIR USE

[75] Inventor: Nils Perchenek, Leverkusen, Germany

[73] Assignee: Bayer Aktiengesellschaft, Leverkusen, Germany

[21] Appl. No.: 264,967

[22] Filed: Jun. 24, 1994

[30] Foreign Application Priority Data

Jul. 7, 1993 [DE] Germany .......................... 43 22 579.9

[51] Int. Cl.$^6$ .......................... C01B 35/10; C22C 21/00; C09K 3/14
[52] U.S. Cl. .......................... 51/307; 420/528; 423/276
[58] Field of Search .......................... 423/276; 51/307; 420/528

[56] References Cited

U.S. PATENT DOCUMENTS

| | | |
|---|---|---|
| 3,286,411 | 11/1966 | Peret . |
| 3,395,986 | 8/1968 | Gruber .................................... 420/528 |
| 4,595,559 | 6/1986 | Planchamp .............................. 420/528 |

FOREIGN PATENT DOCUMENTS 1124027  2/1962  Germany .

OTHER PUBLICATIONS

Ullman's Encyclopedia of Industrial Chemistry (5th Ed.) vol. A4, pp. 303–307.

*Primary Examiner*—Wayne Langel
*Attorney, Agent, or Firm*—Connolly & Hutz

[57] ABSTRACT

The invention relates to ternary element compounds in a novel Al-B-P system, to a process for their production and to their use.

12 Claims, No Drawings

TERNARY ELEMENT COMPOUNDS IN THE Al-B-P SYSTEM, PROCESSES FOR THEIR PRODUCTION AND THEIR USE

This invention relates to ternary element compounds in a novel Al-B-P system, to processes for their production and to their use.

Ternary element compounds in the AlB-P system have not hitherto been known. In Ullmann's Encyclopedia of Industrial Chemistry, 5th Ed., Vol. A4, pages 303 et seq., the compounds $AlB_2$, $AlB_{12}$, $BP$, $B_{12}P_2$ and $B_{13}P_2$ are mentioned as binary phases in the Al-B and B-P systems. Of these compounds, $AlB_{12}$ is used in conjunction with hard metals in cutting tools. DE-A 1 124 027 describes the use of BP for abrasive applications while U.S. Pat. No. 3,286,411 describes the production of grindstones of oxide-bonded $B_{13}P_2$. Unfortunately, disadvantages of the binary compounds include a comparatively low hardness ($AlB_{12}$) and unsatisfactory mechanical properties (boron phosphides).

The problem addressed by the present invention was to provide new compounds which could be used as hard materials and processes for the production of these compounds in variable particle sizes.

These requirements are satisfied by the following new compounds which are the subject of the present invention. The compounds in question are ternary element compounds of the elements aluminium, boron and phosphorus.

In one preferred embodiment, each element is present in a quantity of 1 to 98 mol-% in the ternary element compounds according to the invention. Preferably at least 50 mol-% of boron is present in the ternary element compounds according to the invention. Compounds in which at least 85 mol-% of boron is present show particularly high hardness values. These compounds include compounds which consist predominantly of icosahedral $B_{12}$ units between which aluminum, phosphorus and optionally boron atoms are present. They are distinguished by extreme resistance to chemical attack. For example, they are resistant to concentrated acids and even to aqua regia and, in crystalline form, are only slowly attacked by molten alkali metals. X-ray diffraction analysis of these compounds generally shows an elementary cell with rhombohedral symmetry because the crystal structure of these phases bears a close relationship to that of α-rhombohedral boron.

In one preferred embodiment, the average particle size of the ternary element compounds according to the invention is more than 80 μm. This is particularly important where the compounds are used in abrasives because coarse-particle material is required for most industrial applications.

The present invention also relates to processes for the production of the ternary element compounds according to the invention.

To produce the ternary element compounds according to the invention, mixtures of aluminum phosphide and elementary boron or aluminum phosphide and boron phosphide or aluminum phosphide and boron phosphide and elemental boron may be reacted in a matrix of liquid aluminum. In one preferred embodiment, the reaction is carried out at temperatures of 1100° C. to 1800° C. Particularly good results are obtained when the cooling rates on completion of the reaction are between 0.1 and 30 K/min. To produce coarse-particle material, it is of advantage for the ratio by weight of aluminum matrix to mixture of reactants to be greater than 4. The aluminum is best used in the form of granules or needles. Fine powders have not been successfully used because the adhering oxide coating complicates formation of the aluminum melt. To avoid oxide formation, it is favorable to carry out the reaction in an inert gas atmosphere. Aluminum oxide or titanium diboride in particular have been successfully used as crucible materials for carrying out the reaction.

The particle size of the product obtained can be varied through the choice of the reaction temperature, the cooling rate and the concentration of the educts in the aluminum melt. The mixing ratio of the educts controls the composition of the ternary element compounds obtained.

The present invention also relates to the use of the ternary element compounds as abrasive particles in abrasive materials.

The following Examples are intended to illustrate the invention without limiting it in any way.

EXAMPLE 1

2.27 g of amorphous boron, 1.25 g of boron phosphide and 0.58 g of aluminum phosphide were mixed with 25 g of aluminum chips and the resulting mixture was heated under argon to 1600° C. in a tube furnace. After a reaction time of 1 hour, the mixture was cooled to room temperature at a rate of 1 K/min. The aluminum matrix was dissolved with semiconcentrated hydrochloric acid and the residue was treated for several hours with hot aqua regia.

3.76 g of product were obtained in the form of large, metallic black crystals. Elemental analysis showed 71.3% of boron, 26.0% of phosphorus and 2.6% of aluminum, corresponding to the composition $Al_{0.18}B_{12.26}P_{1.55}$. Electron-dispersive X-ray analysis showed a uniform distribution of aluminum and phosphorus in the crystals up to the resolution limit of 500 nm. Rhombohedral elementary cells with the lattice constants $a=5.963(1)$Å and $c=11.872(1)$Å were determined by X-ray diffractometry. The material had a Vickers hardness, as measured under a test load of 2N, of 34 GPa.

EXAMPLE 2

1.30 g of amorphous boron, 0.42 g of boron phosphide and 0.58 g of aluminum phosphide were mixed with 20 g of aluminum chips and the resulting mixture was heated under argon to 1650° C. in a tube furnace. After a reaction time of 1 hour, the mixture was cooled to room temperature at a rate of 2 K/min. The aluminum matrix was dissolved with semiconcentrated hydrochloric acid and the residue was treated for several hours with hot aqua regia.

1.86 g of product were obtained in the form of large, metallic black crystals. Elemental analysis showed 68.0% of boron, 27.4% of phosphorus and 4.4% of aluminum, corresponding to the composition $Al_{0.3}B_{12.0}P_{1.7}$. Electron-dispersive X-ray analysis showed a uniform distribution of aluminum and phosphorus in the crystals up to the resolution limit of 500 nm. The material had a Vickers hardness, as measured under a test load of 2N, of 33 GPa.

What is claimed is:

1. Ternary element compounds of aluminum, boron and phosphorus, wherein each of said elements is present in a quantity of 1 to 90 mol-%.

2. Ternary element compounds as claimed in claim 1, wherein boron is present in a quantity of at least 50 mol-%.

3. Ternary element compounds as claimed in claim 2, wherein boron is present in a quantity of at least 85 mol-%.

4. Tertiary element compounds as claimed in claim 3, in which the boron exists predominantly in the form of icosahedral $B_{12}$ units between which aluminum, phosphorus and optionally boron atoms are present.

5. Ternary element compounds as claimed in claim 3 having rhombohedral crystal symmetry.

6. Ternary element compounds as claimed in claim 1 in the form of particulates having a particle size of more than 80 μm.

7. An abrasive material comprising the particles as claimed in claim 6.

8. A process for producing ternary element compounds of aluminum, boron and phosphorus, comprising reacting mixtures of aluminum phosphide and boron, or aluminum phosphide and boron phosphide, or aluminum phosphide and boron and boron phosphide, in liquid aluminum.

9. A process as claimed in claim 8 carried out at temperatures of 1100° C. to 1800° C.

10. A process as claimed in claim 8 further comprising cooling after the reaction at a cooling rate of between 0.1 and 30 K/min.

11. The process of claim 10 further comprising, after cooling, dissolving the aluminum to recover the compounds in crystal form.

12. A process as claimed in claim 8, wherein the ratio by weight of aluminum to said mixture is greater than four.

* * * * *